Nov. 11, 1958    M. N. HUFFMAN    2,860,147
3,5-CYCLO STEROIDS AND THE PRODUCTION THEREOF
Filed Dec. 10, 1956
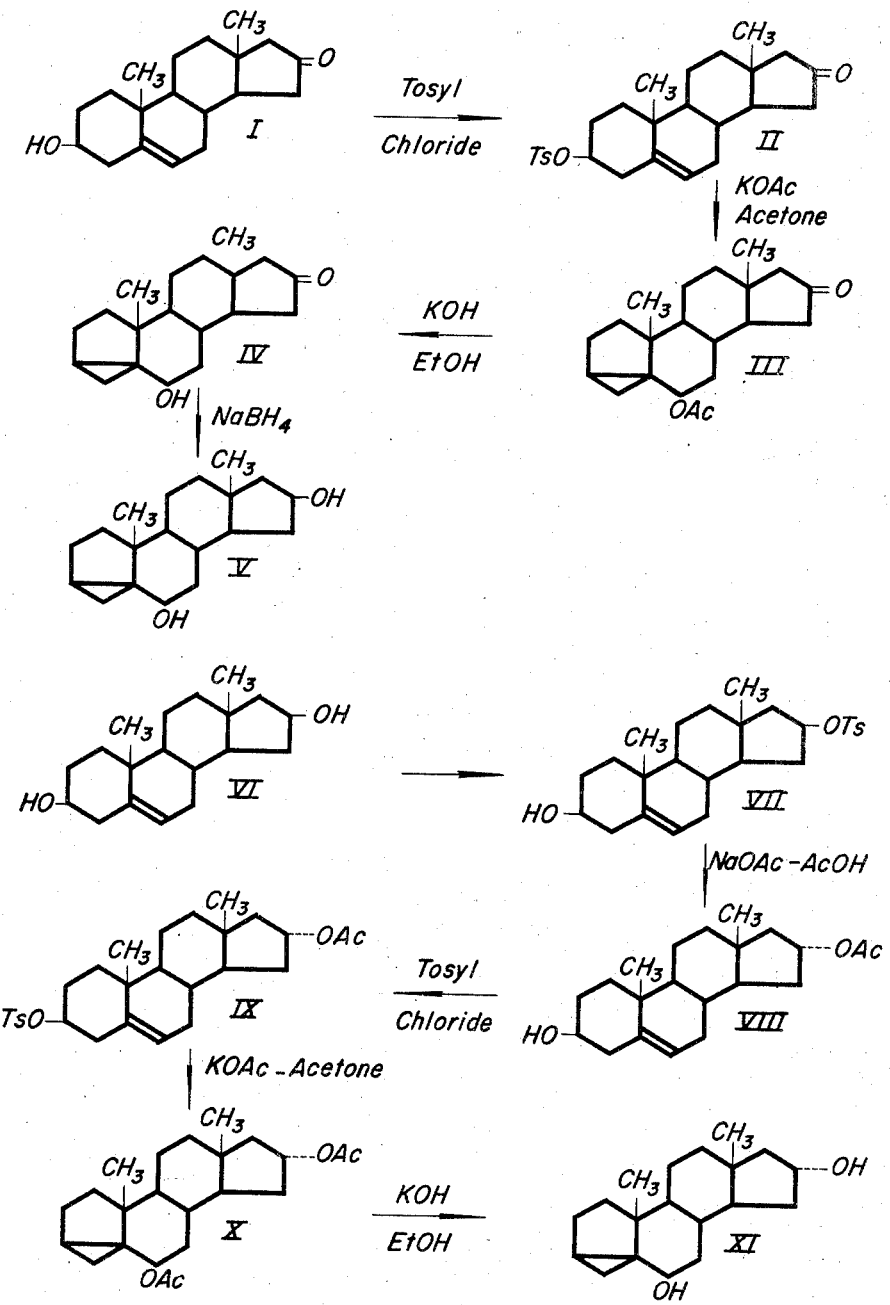
INVENTOR.
MAX N. HUFFMAN
BY
Mason, Kalehmainen, Rathburn and Wyss
ATTORNEYS

United States Patent Office
2,860,147
Patented Nov. 11, 1958

2,860,147
3,5-CYCLO STEROIDS AND THE PRODUCTION THEREOF

Max N. Huffman, Oklahoma City, Okla., assignor to Lasdon Foundation, Inc., Yonkers, N. Y., a corporation of Delaware Application December 10, 1956, Serial No. 627,508

22 Claims. (Cl. 260—397.4)

This invention relates to 3,5-cycloandrostan compounds and to the production thereof, as well as to derivatives of such compounds. More particularly this invention relates to steroid substances having the general formula

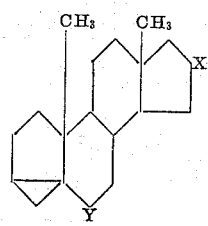

wherein X is a member of the group consisting of hydroxyl, oxo, —OR and —OOCR radicals and Y is a member of the group consisting of hydroxyl, —OR and —OOCR radicals, wherein R is a hydrocarbon radical having from one to seventeen carbon atoms.

The compounds of this invention are valuable for the lowering of blood pressure in the dog, the compound 3,5-cyclo-androstan-6,16alpha-diol being particularly active in this regard.

It is the object of this invention to provide new cyclo steroids of the androstan series as well as esters and ethers of such compounds. It is another object of this invention to provide methods of producing such compounds efficiently from available sources of steroids. It is a further object of this invention to provide new and useful steroid compounds which exhibit hypotensive properties. These and other objects will be apparent from the following description of the invention taken in connection with the attached drawing.

The accompanying single sheet of drawing constitutes two process diagrams, one illustrating the synthesis of 3,5-cycloandrostan-6-ol-16-one and 3,5-cycloandrostan-6,16beta-diol utilizing 5-androsten-3beta-ol-16-one as the starting material, and the other process diagram representing the synthesis of 3,5-cycloandrostan-6,16alpha-diol employing 5-androsten-3beta,16beta-diol as the starting material.

The respective starting materials used in producing the compounds of this invention are described in a publication of the applicant and co-workers in The Journal of Biological Chemistry, volume 218, pages 565-569 (February 1956) and in United States Patent No. 2,759,952.

Referring to the first process diagram in which the particular process steps from I to V are shown, the initial step consists in converting 5-androsten-3beta-ol-16-one (I) into an ester of an aromatic sulfonic acid, such as p-toluenesulfonic acid, for example, by reacting (I) with an acid halide of said aromatic sulfonic acid in a solvent medium comprising pyridine, quinoline, dimethylaniline and similar tertiary amines. The resulting aromatic sulfonic acid ester is then treated with an alkali metal salt of a lower alkanoic acid, for example, sodium acetate or potassium propionate, in an aqueous solution of a lower ketone. This reaction thus described acts to bring about a change in the ring structure of the steroid aromatic sulfonic acid ester with the formation of a 3,5-cyclo structure containing a 3,5-carbon-carbon linkage, and, in addition, results in the introduction of an acyloxy substituent at the 6-position. The resulting ester can then be hydrolyzed with an alcoholic alkali metal hydroxide so that the 6-acyloxy substituent is converted to a free hydroxyl radical, yielding a 3,5-cycloandrostan-6-ol-16-one (IV). The latter can be reduced at the 16-position to a 3,5-cycloandrostan-6,16beta-diol (V) by reduction with an alkali metal hydride of a metal of group III of the periodic table, preferably at a temperature below about 50° C.

The second flow or process diagram describes the steps employed in going from compounds VI to XI and illustrates the production of the 16-epimer of the beta compound (V) described above. In the preparation of this isomer, which is 3,5-cycloandrostan-6,16alpha-diol (XI), it is convenient to begin with the intermediate 5-androsten-3beta,16beta-diol (VI). The synthesis of this compound has been described in my U. S. Patent No. 2,759,952. Thus, in the procedure described in the second process diagram, 5-androsten-3beta-,16beta-diol is esterified to yield an aromatic sulfonic acid ester which is formed by reacting said compound with an aromatic sulfonyl chloride in a solvent medium comprising a high boiling tertiary amine. The product of this esterification is the sulfonic acid 3,16-di-ester and this di-ester can be preferentially hydrolyzed at the 3-position by treatment with dilute acid in an aqueous organic solvent at a temperature below about 100° C. Under this mild acid hydrolysis, the ester group at the 3-position is preferentially hydrolyzed while that in the 16-position remains unchanged. This sulfonic acid 16-mono-ester is then heated with an alkali metal salt of an alkanoic acid in the presence of an excess of alkanoic acid. This reaction causes the epimerization of the substituent in the 16-position from the beta-configuration to the alpha-configuration and the substitution of an alkanoyl group for the aromatic sulfonyl radical, the product obtained being a 5-androsten-3beta-ol-16alpha-acyloxy compound. When this 5-androsten-3beta-ol-16alpha-acyloxy compound is treated with an aromatic sulfonyl halide in the presence of a high boiling tertiary amine, as described above, the reaction product is a 5-androsten-3beta,16alpha-diol-3-(aromatic sulfonate)-16-alkanoate. On heating this sulfonic acid 3-ester with an alkali metal salt of an alkanoic acid in a aqueous lower ketone at a temperature below about 100° C., the steroid configuration is shifted internally to form a 3,5-cyclo structure with a 3,5-carbon-carbon linkage. At the same time the aromatic sulfonic acid group is removed and appears to undergo conversion to an alkanoyl derivative, with a shifting or migration to the 6-position. On saponification with alcoholic alkali, the ester radicals in the 6-and 16-positions are hydrolyzed yielding the hydroxy compound 3,5-cyclo-androstan-6,16alpha-diol (XI).

As will be noted from the foregoing description, one of the novel features of this invention is the provision of a simple and efficient method for producing 3,5-cycloandrostan-6,-16-diol and 3,5-cycloandrostan-6-ol-16-one and related steroids from androstan compounds which have both a double bond in the 5,6-position of ring B, a hydroxyl substituent at the 3-position on ring A, and a hydroxyl or oxo group at the 16-position of ring D. In my process, as described, the 3-hydroxyl radical is esterified with an aromatic sulfonyl halide, or by reaction with an aromatic sulfonic acid and the ester obtained is then heated with an alkali metal salt of an alkanoic acid, such as sodium acetate or potassium propionate, in a lower aliphatic ketone solvent. The ring structure of the steroid is thus rearranged with the formation of a 3,5-cyclo configuration having a 3,5-carbon to carbon linkage. At the same time a shifting or migration of the ester group from the 3-position to 6-position takes place with the aromatic sulfonyl radical being substituted by an alkanoyl radical. This rearrangement is readily carried out under reaction conditions involving the use of temperatures of from 50° to 100° C. and of up to about 125° C. and the structurally rearranged 6-ester is obtained in high yield. The ester produced by this novel structural rearrangement can be readily hydrolyzed and the 3,5-cyclo steroid thus obtained has a free hydroxyl substituent in the 6-position.

The novel hydroxy compounds obtained in accordance with this invention are readily converted into esters and ethers by the usual procedures for esterifying or etherifying hydroxy compounds. Examples of such esters are the acetate, propionate, butyrate, cyclopentylpropionate, laurate, palmitate, trimethylacetate, enanthate, phenylacetate, stearate and similar esters of fatty acids and derivatives thereof, while examples of the esters of aromatic acids which these novel steroid compounds yield are the benzoate, toluate, naphthoate and the like. Advantageously, when esters of dibasic acids such as succinic, glutaric, adipic, sebacic, phthalic and the like are formed of the compounds of this invention, and such esters contain one or more free carboxyl groups, it has been found that the carboxyl groups aid materially in solubilizing the products in aqueous alkaline solutions. Esters of the foregoing type can be produced by reaction of the steroids with the respective acid chlorides in the presence of pyridine, quinoline, dimethylaniline or the like and precipitated by addition of water.

Other valuable derivatives include the lower ethers such as the methyl, ethyl, propyl, butyl, amyl, allyl, crotyl, vinyl, methallyl, propargyl, cyclopentylpropyl, and the like, as well as aralkyl ethers such as the benzyl and phenethyl ethers and the like. Such ethers can be prepared by treatment of the hydroxy steroids with the corresponding alkyl halides or sulfates or with alkenyl or aralkyl halides in the presence of acid-binding agents such as sodium hydroxide, potassium carbonate, or silver oxide. All of these products can be represented by the general structural formula set out above, and more particularly, wherein X is a hydroxyl, oxo, —OR or —OOCR radical and Y is a hydroxyl, —OR or —OOCR radical in which R is a hydrocarbon radical, as defined herein.

The invention is disclosed in further detail by the following examples which are provided for the purpose of illustration only and are not intended to limit the invention in spirit or in scope. Quantities of materials are indicated in grams and milligrams (mg.) and volumes are indicated in milliliters (ml.), while temperatures are recorded in degrees centigrade.

EXAMPLE 1

*3,5-cycloandrostan-6-ol-16-one*

A solution of 7.76 grams of 5-androsten-3 beta-ol-16-one in 150 ml. of dry pyridine was cooled to 0–5° C. in an ice bath and 16 grams of solid p-toluenesulfonyl chloride added. The mixture was swirled to effect solution and then permitted to remain at 0–5° C. for one hour. The reaction mixture was allowed to stand at room temperature for about 24 hours and then 4 liters of ice water were added to precipitate 5-androsten-3beta-ol-16-one p-toluenesulfonate (II). The precipitate was washed well with water and dried at 40° C. The ester (II) was then dissolved in 400 ml. of acetone and the solution heated to reflux and treated with 16 grams of anhydrous potassium acetate in 400 ml. of water and 550 ml. of acetone. The resulting solution was refluxed for 6 hours, then evaporated until the organic material began to separate. The mixture was chilled and extracted with 1.5 liters of ether in two portions. The combined ether solutions were washed with water containing a little pyridine, dried and evaporated to dryness. The oily residue of 3,5-cycloandrostan-6-ol-16-one acetate (III) was refluxed for an hour with a solution of 25 grams of potassium hydroxide in 500 ml. of 95% ethanol. The solution was cooled and diluted with 3 liters of ice water. The aqueous mixture was then extracted three times with ether. The combined ethereal solutions were washed with water and dried. Evaporation of the ether gave a residue of 7.25 grams of crystalline 3,5-cycloandrostan-6-ol-16-one (IV). This was dissolved in 363 ml. of 90% ethanol, and one-half of the solution was mixed with a solution of 15.36 grams of digitonin in 1536 ml. of 90% ethanol. After several days at room temperature the solution was evaporated to about 500 ml. under vacuum at 50–55° C. and then diluted with 3 liters of ice water and extracted with ether. The ether extract was washed with ice water and dried with anhydrous sodium sulfate. After a filtration and evaporation of the ether extract, a crystalline residue of 2.79 grams of 3,5-cycloandrostan-6-ol-16-one (IV) was obtained. On crystallization from petroleum ether and acetone, the material was obtained in the form of leaflets melting at 123–123.5° C. The optical rotation of this compound was $[\alpha]_D^{24}$ −151° (c.=1.02 in chloroform).

EXAMPLE 2

*3,5-cycloandrostan-6,16beta-diol*

A solution of 1.395 grams of 3,5-cycloandrostan-6-ol-16-one (IV) in 65 ml. of absolute methanol containing 5 ml. of dry pyridine was cooled to ice temperature and treated with a solution of 1.12 grams of sodium borohydride in 10 ml. of absolute methanol containing 4 ml. of dry pyridine. The reaction mixture was agitated periodically for 45 minutes while maintained at about 0° C. Then 400 ml. of ice water and 15 ml. of acetone were added and the mixture allowed to stand for 15 minutes. Subsequently 1200 ml. of ice water were added causing the precipitation of white crystals of 3,5-cycloandrostan-6,16beta-diol (V). This material was collected on a filter, washed thoroughly with water and dried at 40° C. A yield of 1.2 grams of 3,5-cycloandrostan-6,16beta-diol (V) melting at 176–177° C. was obtained. On further recrystallization from aqueous methanol material melting at 197–198° C. was obtained. The optical rotation of this substance was: $[\alpha]_D^{24}$ +27.5° (c.=1.02 in chloroform).

EXAMPLE 3

*3,5-cycloandrostan-6,16alpha-diol*

3.24 grams of 5-androsten-3beta,16beta-diol (VI) were treated with 13 grams of p-toluenesulfonyl chloride in 100 ml. of dry pyridine, by the method of Example 1. Upon addition of 2.5 liters of ice water a precipitate of 5-androsten-3beta,16beta-diol di-p-toluenesulfonate was obtained. This was collected on a filter, washed well with water and dried at 40° C. It was dissolved in 480 ml. of warm acetone and 110 ml. of 2% sulfuric acid were added. The resulting solution was refluxed for about two hours, diluted with 110 ml. of water and evaporated until turbid. On cooling to room temperature and dilution with 800 ml. of ice water, a precipitate of 5- androsten - 3beta,16beta - diol-16-p-toluenesulfonate (VII) was formed. This was recrystallized from aqueous acetone and formed fine crystals melting either at 139–139.5° C. or 149–150° C. in two crystalline modifications.

1.88 grams of 5-androsten-3beta,16beta-diol-16-p-toluenesulfonate (VII) were dissolved in 82 ml. of glacial acetic acid containing 4.1 grams of freshly fused sodium acetate. The solution was refluxed for an hour, then cooled to room temperature and diluted with ice water. The precipitate of 5-androsten-3beta,16alpha-diol-16-acetate (VIII) was washed with water, air dried and recrystallized from aqueous alcohol. It was dissolved in 100 ml. of 90% ethanol and treated with a solution of 5.68 grams of digitonin in 568 ml. of 90% ethanol. After standing for about 15 hours the precipitate of digitonide was removed by filtration, washed with ether and dried. The digitonide was dissolved in 75 ml. of warm anhydrous pyridine and diluted with 750 ml. of anhydrous ether to precipitate digitonin. The mixture was filtered and the filtrate was washed with three 100 ml. portions of 1.2 normal hydrochloric acid and then with ice water until neutral. The ether solution was dried with anhydrous sodium sulphate, filtered and evaporated. The residue was dissolved in 20 ml. of acetone and treated with petroleum ether. A precipitate of 5-androsten-3beta,16alpha-diol-16-acetate (VIII) separated and crystallized. On recrystallization from aqueous methanol, the material melted at 169-170° C.

430 mg. of 5-androsten-3beta,16alpha-diol-16-acetate (VIII) in 20 ml. of pyridine at ice temperature were treated with 860 mg. of p-toluenesulfonyl chloride. After 1 hour at ice temperature the mixture was brought to room temperature and allowed to stand for 15 hours. It was diluted with ice water and the precipitate of 5 - androsten-3beta,16alpha-diol-3-p-toluene-sulfonate-16-acetate (IX) was collected, washed with water and dried. This was dissolved in 60 ml. of acetone containing 900 mg. of potassium acetate and 22 ml. of water. The solution was refluxed for 6 hours, evaporated to turbidity and refrigerated. A crystalline precipitate of 3,5-cyclo-androstan-6,16alpha-diol diacetate (X) was formed. This was removed, dissolved in 30 ml. of 95% ethanol containing 1.5 grams of potassium hydroxide and agitated until dissolved. The solution was refluxed for 1 hour, then diluted with 30 ml. of water and evaporated until turbidity occurred. On cooling to room temperature, an oil formed which soon solidified. The precipitate of 3,5-cycloandrostan-6,16alpha-diol (XI) was removed by filtration, washed and dried. On recrystallization from aqueous methanol and from a mixture of acetone and petroleum ether, platelets melting at 152.5-153.5° C. were obtained. The optical rotation of this material was: $[\alpha]_D^{31} + 16°$ (c=1.09 in chloroform).

EXAMPLE 4

5-androsten-3beta,16alpha-diol-16-acetate (VIII) can be prepared by an alternative procedure as follows:

960 mg. of 5-androsten-3beta,16alpha-diol (U. S. Patent No. 2,759,952) were dissolved in 31.2 ml. of glacial acetic acid and the solution refluxed for 2 hours while protected from moisture. The solution was cooled to room temperature and partitioned between 500 ml. of benzene and 300 ml. of water. The benzene then was separated, washed with water until neutral and evaporated to dryness. The residue of 1.10 grams of 5-androsten-3beta,16alpha-diol-16-acetate was dissolved in 80 ml. of 90% ethanol. To this solution was added a solution of 4.4 grams of digitonin in 440 ml. of 90% alcohol. After standing over night, the precipitate of digitonide was removed, washed well with ether and dried. It was then dissolved in 50 ml. of warm anhydrous pyridine and treated with 500 ml. of anhydrous ether. The ether solution was filtered and washed with 10% hydrochloric acid and then with water until neutral. The ether layer was dried with anhydrous potassium carbonate, filtered and evaporated. The residue of 5-androsten-3beta,16-alpha-diol-16-acetate (VIII) was recrystallized from aqueous methanol and crystals melting at 169.5-170° C. were obtained.

I claim:
1. A compound of the formula

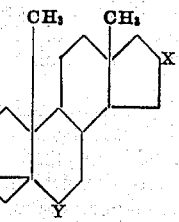

wherein X is a member of the group consisting of hydroxyl, oxo, —OR and —OOCR radicals and Y is a member of the group consisting of hydroxyl, —OR and —OOCR radicals, wherein R is a hydrocarbon having from one to seventeen carbon atoms.
2. A compound as defined in claim 1 wherein X and Y are hydroxyl radicals.
3. 3,5-cycloandrostan-6,16-diol.
4. 3,5-cycloandrostan-6,16alpha-diol.
5. 3,5-cycloandrostan-6,16beta-diol.
6. A compound as defined in claim 1 wherein X and Y are —OOCR radicals in which R is a hydrocarbon radical having from one to seventeen carbon atoms.
7. An alkanoic acid ester of 3,5 - cycloandrostan-6,16-diol.
8. An acetic acid ester of 3,5-cycloandrostan-6,16-diol.
9. 3,5-cycloandrostan-6,16-diol diacetate.
10. 3,5-cycloandrostan-6,16-diol monoacetate.
11. A compound as defined in claim 1 wherein X is oxo and Y is hydroxyl.
12. A compound as defined in claim 1 wherein X is oxo and Y is a radical of the formula —OOCR in which R is a hydrocarbon radical having one to seventeen carbon atoms.
13. 3,5-cycloandrostan-6-ol-16-one alkanoate.
14. 3,5-cycloandrostan-6-ol-16-one acetate.
15. A method of producing a 3,5-cyclo steroid as defined in claim 1 which comprises reacting an aromatic sulfonic acid ester of a 3-hydroxy-Δ5-steroid of the formula

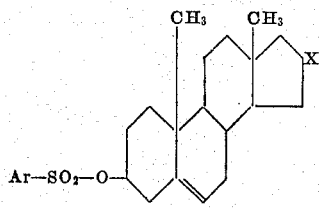

wherein X is a member of the group consisting of hydroxyl, oxo, —OR and —OOCR radicals wherein R is a hydrocarbon radical having one to seventeen carbon atoms and Ar is an aromatic hydrocarbon radical having six to ten carbon atoms, with an alkali metal salt of an aliphatic acid in a water-miscible ketone to form a 3,5-cyclo-6-hydroxy-steroid ester of said aliphatic acid.
16. A method of producing a 3,5-cyclo steroid as defined in claim 1 wherein X and Y are hydroxyl radicals, which comprises reacting an aromatic sulfonic acid ester of a 3-hydroxy-Δ5-steroid of the formula

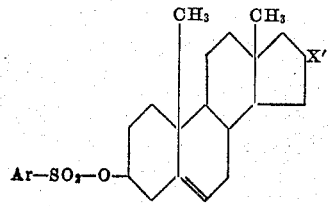

wherein X' is a radical selected from the group consisting of hydroxyl and —OOCR radicals wherein R is a hydrocarbon radical having one to seventeen carbon atoms, and wherein Ar is an aromatic hydrocarbon radical having six to ten carbon atoms, with an alkali metal salt of an aliphatic acid in a water-miscible ketone to form a 3,5-cyclo-6-hydroxy-steroid ester of said aliphatic acid, and hydrolyzing said steroid ester to a 3,5-cyclo-6,16-dihydroxy-steroid.

17. A method of producing 3,5-cycloandrostan-6-ol-16-one which comprises reacting 5-androsten-3beta-ol-16-one toluenesulfonate with an alkali metal salt of an alkanoic acid in a water-miscible ketone to form a 3,5-cycloandrostan-6-ol-16-one alkanoate, and hydrolyzing said 3,5-cycloandrostan-6-ol-16-one alkanoate to a 3,5-cycloandrostan-6-ol-16-one.

18. A method of producing a 3,5-cycloandrostan-6-ol-16-one alkanoate which comprises reacting 5-androsten-3beta-ol-16-one toluensulfonate with an alkali metal salt of an alkanoic acid in a water-miscible ketone and separating the 3,5-cycloandrostan-6-ol-16-one alkanoate thus formed.

19. A method of producing 3,5-cycloandrostan-6-ol-16-one acetate which comprises heating 5-androsten-3beta-ol-16-one p-toluenesulfonate with potassium acetate in acetone at a temperature not greater than about 100° C. and separating the 3,5-cycloandrostan-6-ol-16-one acetate thus formed.

20. A method of producing 3,5-cycloandrostan-6,16-diol which comprises reacting a 5-androsten-3beta,16-diol-3-toluenesulfonate-16-alkanoate with an alkali metal salt of an alkanoic acid in a water-miscible ketone to form a 3,5-cycloandrostan-6,16-diol dialkanoate, and hydrolyzing said 3,5-cycloandrostan-6,16-diol dialkanoate to a 3,5-cycloandrostan-6,16-diol.

21. A method of producing a 3,5-cycloandrostan-6,16-diol dialkanoate which comprises reacting 5-androstan-3beta,16-diol-3-toluenesulfonate-16-alkanoate with an alkali metal salt of an alkanoic acid in a water-miscible ketone and separating the 3,5-cycloandrostan-6,16-diol dialkanoate thus formed.

22. A method of producing 3,5-cycloandrostan-6,16-diol diacetate which comprises heating 5-androstan-3beta,16-diol-3-p-toluenesulfonate-16-acetate with potassium acetate in acetone at a temperature not greater than about 100° C. and separating the 3,5-cycloandrostan-6,16-diol diacetate thus formed.

References Cited in the file of this patent

UNITED STATES PATENTS

| | | |
|---|---|---|
| 2,324,881 | Ruzicka et al. | July 20, 1943 |
| 2,366,204 | Marker et al. | Jan. 2, 1945 |
| 2,368,199 | Butenandt et al. | Jan. 30, 1945 |
| 2,595,596 | Moffett | May 6, 1952 |